Oct. 22, 1946.  W. R. WILLIAMS  2,409,969
NUT-LOCK
Filed Dec. 15, 1942
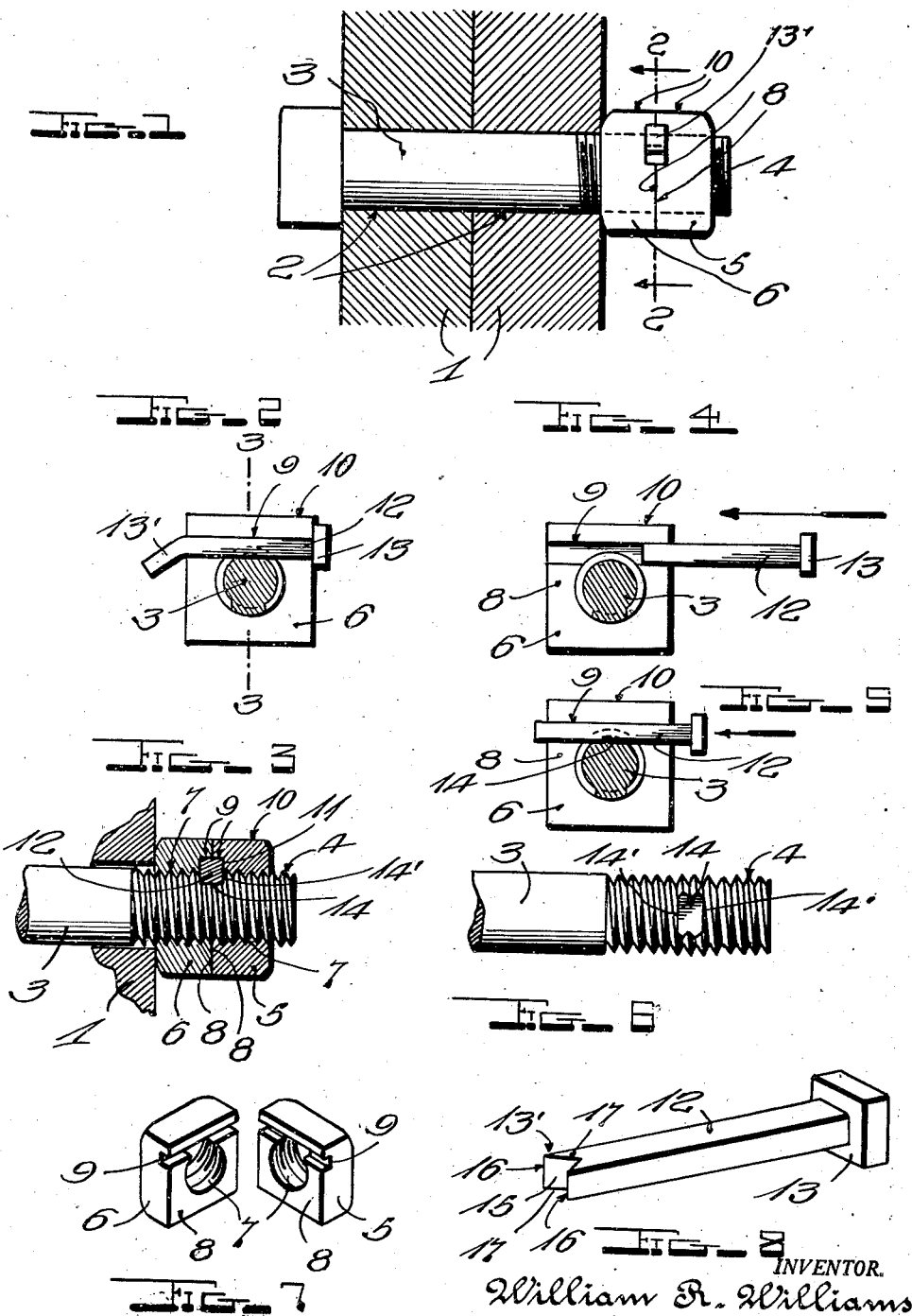
INVENTOR.
William R. Williams,
BY
Shreve, Crowe & Gordon
ATTORNEYS Patented Oct. 22, 1946

2,409,969

UNITED STATES PATENT OFFICE 2,409,969

NUT LOCK

William R. Williams, Dunsmuir, Calif.

Application December 15, 1942, Serial No. 469,102

3 Claims. (Cl. 151—15)

Generically this invention relates to nut-locks, and constitutes an improvement on my co-pending application Serial No. 337,280, filed May 25, 1942, for Nut-lock.

One of the principal objects of this invention is the provision of a nut-lock structure including complemental nuts, and means co-acting therewith and the bolt, after the nuts have been threadedly positioned thereon, to lock and retain said nuts in such adjusted and tightened position.

Another important object of this invention is the provision of a pair of nuts having their meeting faces complementally formed to provide an opening extending tangentially to and interrupted by a bolt when said nuts are in tightened position thereon, and means for completing the opening through the interrupting portion of the bolt.

A further important object of this invention is the provision of a pair of threaded nuts having their meeting faces complementally formed to provide, when the nuts are in their proper tightened position on the bolt, an opening extending tangentially to and interrupted by said bolt, means for cutting away the bolt to complete said opening, and key means lockable in said opening to rigidly connect said nuts and bolt to prevent movement of the nuts from their set position irrespective of the jars and vibrations incident to rough and continued usage.

A still further object of this invention is the provision of means for locking a pair of nuts in their set positions on a bolt, especially when the latter are used in connection with railway rolling stock, motor vehicles, and the like, consisting in forming complemental grooves in the meeting faces of the respective nuts to form a key opening when they have been threaded to their proper position, a cutting element movable through said opening to form a transverse slot or keyway in said bolt according to the set position of said nuts, said cutting element constituting a key lockable in said opening and co-acting with said bolt to prevent movement of said nuts by reason of vibratory vehicular movement.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Fig. 1 is an elevational view of my improved nut-lock device in operative position.

Fig. 2 is a cross section on the line 2—2 of Fig. 1.

Fig. 3 is a longitudinal section on the line 3—3 of Fig. 2.

Fig. 4 is a similar view to Fig. 2 with the cutting element in position to cut the bolt key-way.

Fig. 5 is a view similar to Fig. 4 showing the cutting element at the completion of its cutting movement.

Fig. 6 is an elevational view of the threaded end of the bolt after it has been cut.

Fig. 7 is an enlarged perspective view of the complemental nuts in disassociated relation.

Fig. 8 is a perspective view of the combination cutting element and key.

I am aware that many efforts have been made to solve the problem of providing a nut-lock structure that would withstand vibration and remain in set position and capable of being manufactured at a non-prohibitive cost, but all of these with which I am familiar have proven unsatisfactory owing to cost of production, loss of the keys, and damage to the threads of the bolt, etc. Therefore, it was to overcome the deficiencies of the structures of this character heretofore in use, that I designed the instant invention by providing a novel nut-lock structure comprising a pair of nuts, the meeting or abutting faces of which are formed with complemental grooves when the nuts are in tightened or set position, to form an opening tangential to and interrupted by a portion of the bolt. Means for cutting the bolt to complete said opening and form a transverse channel in said bolt of a depth greater than that of the threads, said means embodying a cutting element conforming in dimensions to said opening, said element additionally adapted upon completion of the cutting operation to constitute a key lockable in said opening to firmly inter-connect said nuts and bolt to retain said nuts in tightened position thereon and prevent their slackening or back movement by reason of vibration, said construction not only permitting formation of the groove and bolt opening in the respective nuts in one stamping or punching operation, but rendering the components, including the bolt, susceptible of repeated use.

In the illustrated embodiment characterizing this invention there is shown, for purpose of illustration, superimposed members 1 formed with registering openings 2 adapted to receive a bolt 3 having a threaded end 4 and a pair of complemental nuts 5 and 6 formed with threaded bolt openings 7 engageable thereon, each nut being formed in its meeting face 8 with a groove 9, in the present instance, extending in parallelism with one edge 10 and intercepting the edge of opening 7 so that when the meeting faces of the the nuts 5 and 6 are in engagement and the grooves 9 in registration the latter will form the opening 11 as shown in Fig. 3. No extra time or labor is required to form the respective channels or grooves 9 in the nuts 5 and 6, since the same operation that forms the conventional bolt hole or opening 7 also forms the groove. When the nuts are in tightened position as shown in Figs. 1 and 3 a portion of the bolt 3 will intercept said opening 11 as shown in Fig. 4 and in which figure nut 5 is removed for purpose of illustration.

After the nuts 5 and 6 have been threaded on the end 4 of bolt 3 to tightened position as shown in Fig. 1 and before the key 12 formed with head 13 can be inserted in opening 11 and locked therein by crimping or otherwise securing its end 13′, it is necessary to complete said opening by cutting a complemental channel 14 in said threaded end 4 preferably of a depth slightly greater than said threads to form key retaining shoulders 14′ in the bolt proper, as shown in Fig. 6.

The manner of forming and the instrumentality by which said channel is formed and the locking of the nuts effected will now be described.

The cross sectional area of key 12 substantially corresponds to that of opening 11 and the end 13′ of said key is formed with a substantially V-shaped cut-out portion 15 having vertical cutting edges 16 and upper and lower cutting edges 17.

Thus the key 12 constitutes a combined cutter and key, obviating both the expense and necessity of a separate cutting tool to be carried around and subject to being misplaced and lost, such structure additionally effecting a saving in material and time requisite to the nut locking operation.

It is obvious that depending upon the exigencies of the particular operating requirements, if desired, the cutting face of said cutter-key may be treated or hardened without departing from the spirit or scope of the invention.

From the above it is apparent that I have designed a nut-lock comprising a pair of nuts complementally formed to provide a common opening and means for forming a coacting channel in a conventional bolt at whatever point the nuts are in tightened position thereon and obviating the necessity of preforming the bolt or of the use of a separate tool for acting on the bolt at all. Also a combined cutter-key means for effecting the cutting of said channel and insertion of the key in the completed opening in one operation, said cutter-key coacting with the ends and shoulders of the channel in the bolt to form a rigid inter-connection whereby stripping of the threads is prevented and locking of the nuts against movement by reason of vibration is effected. Said key is locked by slightly bending or crimping its free end, and where desired it may be straightened prior to its removal, whereby all parts of the nut-lock structure may be subject to repeated use, such structure being manufacturable at a cost slightly, if any, exceeding that of the usual bolt structure, yet absolute in its effective use, and efficient for the purposes indicated.

Although in practice I have found that the form of my invention illustrated in the accompanying drawing and referred to in the above description as the preferred embodiment, is the most efficient and practical, yet realizing the conditions concurrent with the adoption of my invention will necessarily vary, I desire to emphasize that various minor changes in details of construction, proportion and arrangement of parts, may be resorted to within the scope of the appended claims without departing from or sacrificing any of the principles of this invention.

Having thus described my invention, what I desire protected by Letters Patent is as set forth in the following claims:

1. The combination with a bolt having a threaded portion, nut means in threaded engagement with the bolt and having a groove partially intersected by a portion of the bolt, a combined cutter and key means, said cutter means adapted after said nut means is in tightened position to cut away the intersecting portion of the bolt to complete the groove through said bolt and form a transverse channel therein by providing shoulders extending below the thread to abut opposite sides of said cutter means to brace the same and prevent stripping of said thread and upon completion of said cutting operation to constitute a key extending through said groove and lockable therein, whereby loss of said key and movement of said nut means relative to said bolt by reason of vibration is prevented.

2. A nut-lock of the character described comprising a threaded bolt, a pair of nuts carried by the threaded portion of said bolt, said nuts being provided with complemental grooves which when in registering position form a common opening intersected by a portion of said bolt, means for completing said opening and forming a complemental transverse channel in said bolt by providing shoulders extending below its thread, said means constituting a key therein coacting with said shoulders to prevent stripping of said thread and for effecting a rigid interconnection between the bolt and nuts, whereby movement of the nuts with respect to said bolt by reason of vibration is prevented.

3. The combination with a bolt initially including an uninterrupted threaded portion, a pair of nuts in threaded engagement with said portion, the abutting faces of the nuts having complemental grooves coacting when brought into registration to form an opening at right angles to and intersected by a portion of the bolt, means formed with cutting edges on one end for cutting away said intersecting portion, after the groove aligned nuts are in completely tightened position, to complete said opening by forming a transverse groove to provide side walls extending below the thread, said means constituting a key extending through said opening to secure said nuts and coacting with said transverse walls to prevent stripping of said thread, and means for locking said key therein to prevent any retractile movement thereof by reason of vibration.

WILLIAM R. WILLIAMS.